US010419069B2

(12) United States Patent
Colonques et al.

(10) Patent No.: US 10,419,069 B2
(45) Date of Patent: Sep. 17, 2019

(54) COMMUNICATION SYSTEM FOR TELEPHONE LINE ACCESS WITH CROSSTALK MITIGATION

(71) Applicant: Maxlinear Asia Singapore PTE LTD., Singapore (SG)

(72) Inventors: Santiago Vicent Colonques, Vila-real (ES); Feliciano Gomez Martinez, San Jose, CA (US)

(73) Assignee: MAXLINEAR ASIA SINGAPORE PRIVATE LIMITED, Singapore (SG)

( * ) Notice: Subject to any disclaimer, the term of this patent is extended or adjusted under 35 U.S.C. 154(b) by 179 days.

(21) Appl. No.: 15/608,419

(22) Filed: May 30, 2017

(65) Prior Publication Data

US 2017/0331515 A1 Nov. 16, 2017

Related U.S. Application Data

(63) Continuation of application No. 14/608,094, filed on Jan. 28, 2015, now Pat. No. 9,667,313.
(Continued)

(51) Int. Cl.
*H04W 4/00* (2018.01)
*H04B 3/32* (2006.01)
(Continued)

(52) U.S. Cl.
CPC ........... *H04B 3/32* (2013.01); *H04L 12/2878* (2013.01); *H04M 3/34* (2013.01); *H04M 11/062* (2013.01); *H04L 2012/2843* (2013.01)

(58) Field of Classification Search
CPC ......... H04B 3/32; H04M 11/062; H04M 3/34; H04L 12/2878; H04L 2012/2843
(Continued)

(56) References Cited

U.S. PATENT DOCUMENTS

| 7,593,418 | B1 | 9/2009 | Benhaim et al. |
| 8,837,510 | B1 | 9/2014 | Benhaim et al. |

(Continued)

OTHER PUBLICATIONS

International Telecommunication Union, ITU-T G.993.5 Series G: Transmission Systems and Media, Digital Systems and Networks, Self-FEXT cancellation (vectoring) for use with VDSL2 transceivers, Recommendation ITU-T G.993.5, Apr. 22, 2010, 79 pages.
(Continued)

*Primary Examiner* — Chuong T Ho
(74) *Attorney, Agent, or Firm* — McAndrews, Held & Malloy, Ltd.

(57) ABSTRACT

Methods and systems are provided for telephone line access with crosstalk mitigation. Electronic equipment located at a first location may include a plurality of first transceiver devices, with each first transceiver device configured for coupling to a respective one of a plurality of telephone lines bundled together in a same telephone cable, to connect to a respective one of a plurality of second transceiver devices at a second location. Each first transceiver device controls communication over the respective telephone line, with controlling including assigning separate time slots for uplink communication and downline communication; and coordinating communication with other ones of the plurality of first transceiver devices, with the coordinating including aligning use of the time slots. Each transceiver device may include a coupling circuitry to connect to the respective telephone line, an analog front end; and a controller that controls communications over the telephone line.

24 Claims, 6 Drawing Sheets

Related U.S. Application Data

(60) Provisional application No. 61/932,585, filed on Jan. 28, 2014.

(51) Int. Cl.
   *H04M 3/34* (2006.01)
   *H04L 12/28* (2006.01)
   *H04M 11/06* (2006.01)

(58) Field of Classification Search
   USPC .................................. 370/201, 329, 330
   See application file for complete search history.

(56) References Cited

U.S. PATENT DOCUMENTS

| | | | |
|---|---|---|---|
| 9,161,247 B2 | 10/2015 | Ro | |
| 9,180,786 B2 | 11/2015 | Hu | |
| 9,825,666 B2* | 11/2017 | Moreno | H04B 3/32 |
| 2005/0157753 A1* | 7/2005 | Mayer | H04M 11/062 |
| | | | 370/468 |
| 2010/0223650 A1 | 9/2010 | Millet et al. | |
| 2011/0205963 A1 | 8/2011 | Tang | |
| 2011/0235657 A1 | 9/2011 | Kim et al. | |
| 2012/0023237 A1 | 1/2012 | Lurie et al. | |
| 2012/0087229 A1* | 4/2012 | Mantri | H04W 28/18 |
| | | | 370/201 |
| 2012/0147934 A1 | 6/2012 | Vazquez | |
| 2012/0176887 A1 | 7/2012 | Mcbeath | |
| 2013/0039347 A1 | 2/2013 | Moqvist | |
| 2013/0051220 A1 | 2/2013 | Ryshakov | |
| 2013/0100856 A1* | 4/2013 | Zadicario | H04L 47/781 |
| | | | 370/254 |
| 2013/0208579 A1* | 8/2013 | Strobel | H04B 3/32 |
| | | | 370/201 |
| 2013/0215951 A1 | 8/2013 | Nuzman | |
| 2013/0272309 A1* | 10/2013 | Kim | H04L 7/00 |
| | | | 370/392 |
| 2013/0272314 A1 | 10/2013 | Kuipers et al. | |
| 2013/0287045 A1* | 10/2013 | Oksman | H04B 3/54 |
| | | | 370/474 |
| 2014/0003274 A1 | 1/2014 | Clerckx | |
| 2014/0086039 A1* | 3/2014 | Mantri | H04W 28/18 |
| | | | 370/201 |
| 2014/0307572 A1 | 10/2014 | Mungall et al. | |
| 2015/0049688 A1 | 2/2015 | Yamazaki | |
| 2015/0163167 A1 | 6/2015 | Liu et al. | |
| 2015/0214999 A1* | 7/2015 | Moreno | H04B 3/32 |
| | | | 379/406.06 |
| 2017/0222788 A1* | 8/2017 | Kim | H04L 7/00 |
| 2017/0230081 A1* | 8/2017 | Kim | H04L 7/00 |
| 2017/0332336 A9* | 11/2017 | Kim | H04L 69/323 |

OTHER PUBLICATIONS

International Telecommunication Union, ITU-T G.993.2, Series G: Transmission Systems and Media, Digital Systems and Networks, Very high speed digital subscriber line transceivers 2 (VDSL2), ITU-T Recommendation G.993.2, Feb. 17, 2006, 250 pages.

Notification of Transmittal of the International Search Report and the Written Opinion of the International Searching Authority, International Application No. PCT/IB2015/000076, dated Apr. 30, 2015, 13 pages.

International Telecommunication Union, Series G: Transmission Systems and Media, Digital Systems and Networks, Unified high-speed wire-line based home networking transceivers—Data link layer specification, ITU-T G.9961, Jun. 2010, 220 pages.

International Telecommunication Union, Series G: Transmission Systems and Media, Digital Systems and Networks, Unified high-speed wire-line based home networking transceivers—Data link layer specification, ITU-T G.9961, Apr. 2014, 306 pages.

International Telecommunication Union, Series G: Transmission Systems and Media, Digital Systems and Networks, Unified high-speed wireline-based home networking transceivers—System architecture and physical layer specification, ITU-T G.9960, Dec. 2011, 160 pages.

Ciofi et al., Digital subscriber line (DSL), Scholarpedia, http://www.scholarpedia.org/article/Digital_subscriber_line_(DSL), Sep. 19, 2014, 13 pages.

IEEE Standard for Broadband over Power Line Networks: Medium Access Control and Physical Layer Specifications, IEEE Standards Association, IEEE Communications Society, Dec. 30, 2010, 1586 pages.

G.hn, Wikipedia, http://enwikipedia.org/wiki/G.hn, Mar. 28, 2012, 12 pages.

HomePlug, Wikipedia, http://en.wikipedia.org/wiki/HomePlug, Apr. 12, 2012, 6 pages.

Precision Time Protocol, Wikipedia, http://en.wikipedia.org/wiki/Precision_ Time_Protocol, Jan. 20, 2015, 5 pages.

* cited by examiner

US 10,419,069 B2

COMMUNICATION SYSTEM FOR TELEPHONE LINE ACCESS WITH CROSSTALK MITIGATION

CLAIM OF PRIORITY AND CROSS REFERENCE TO RELATED APPLICATIONS

This patent application is a continuation of U.S. patent application Ser. No. 14/608,094, filed Jan. 28, 2015, which in turn claims the benefit of the priority of U.S. Provisional Patent Application Ser. No. 61/932,585, filed Jan. 28, 2014. Each of above identified applications is hereby incorporated herein by reference in its entirety. In addition, this patent application is related to U.S. Provisional Patent Application Ser. No. 61/932,599, filed Jan. 28, 2014, which is hereby herein by reference in its entirety.

BACKGROUND

The present disclosure describes systems and techniques relating to wired communication channels, such as telephone lines in a bundled telephone cable.

G.hn is a home networking standard developed by ITU (International Telecommunications Union). The G.hn standard describes a multi-node network (similar to a WiFi network) that shares a channel (power line, phone line or coax cable). A network is known as a "domain" in the standard. A domain is controlled by a single node called Domain Master (DM). The Domain Master is in charge of coordinating the transmissions of all the nodes in the network (scheduling) to avoid collisions in the channel and guarantee a required level of quality of service (QoS) to the traffic conveyed in the domain. Each node can communicate with any of the other nodes of the domain (multi-point to multi-point communications).

On the other hand, the architecture of DSL (Digital Subscriber Line) phone line access applications is different. The architecture of DSL is based on a pair of nodes that communicate with each other: one node is placed at the customer side, referred to as the CPE (Customer Premises Equipment), and the other node is an operator node placed at the telephone company side, typically along with other operator nodes in a DSLAM (DSL Access Multiplexer). Since several operator nodes are typically collocated at the DSLAM, the operator nodes have the potential to interfere with each other, as phone lines run together from the DSLAM to each of the customer premises and can suffer from crosstalk among the phone lines. There are two sources of interference: NEXT (near end crosstalk) interference from one operator node to another operator node, and FEXT (far end crosstalk) interference from one operator node to the CPEs of other lines (or the other way around; interference from one CPE to the operator nodes of other lines). DSL standards have developed different ways of overcoming this interference. In addition, improvements have been proposed for DSL to increase its speed; such proposals are often referred to as VDSL.

SUMMARY

The present disclosure includes systems and techniques relating to wired communication channels, such as telephone lines in a bundled telephone cable. G.hn technology is being observed as an alternative to a next generation of VDSL. However, the network architecture of G.hn has been designed for use as a home network connecting several devices using any of the available cables in a home (over AC (Alternating Current) power lines, telephone lines or coaxial lines). As described herein, G.hn technology can be modified improve utility in a DSL-like communication system.

According to an aspect of the described systems and techniques, a system includes telephone lines that cover a distance from a first location to separate points at second locations, where the telephone lines are bundled together in a same telephone cable for at least a portion of the distance; electronic equipment located at the first location, the electronic equipment including a first transceiver device for each of the telephone lines, where each first transceiver device at the first location is configured to coordinate transmissions over a respective telephone line coupled with the first transceiver device; and second transceiver devices coupled respectively with the telephone lines at the second locations, such that each second transceiver device is respectively paired with a first transceiver device at the first location; where each pair of first and second transceiver devices is configured to communicate over the respective telephone line connecting the pair using a Medium Access Control (MAC) cycle that is split into predefined slots in time for (i) downstream communication from the first transceiver device to the second transceiver device and (ii) upstream communication from the second transceiver device to the first transceiver device; and where the first transceiver devices are synchronized with each other to align the MAC cycle and the predefined time slots across the telephone lines.

Each transceiver device at the first location can be configured to operate in accordance with a specification designed for multi-point to multi-point communications over home electrical wiring, at least one of the second locations can have more than one second transceiver device coupled with a single telephone line, and the more than one second transceiver device can share the upstream communication slots on the single telephone line. The specification can be a G.hn specification. In addition, a Zero Cross signal input of each of the first transceiver devices can be connected to a common reference clock to synchronize the first transceiver devices.

The predefined slots in time can have an unbalanced distribution between downstream communication and upstream communication. The unbalanced distribution can assign more time slots to downstream communication than upstream communication, and time slots assigned to upstream communication can be distributed to reduce latency. In some cases, the unbalanced distribution can assign seven of each ten slots to downstream communication and three of each ten slots to upstream communication. Moreover, each one of the first transceiver devices can be configured to use a preamble that is different from each other preamble used by remaining ones of the first transceiver devices, and the first transceiver devices can be configured to use up to three hundred different preambles.

According to an aspect of the described systems and techniques, a transceiver device includes a coupling circuitry configured to connect with a telephone line that is bundled with additional telephone lines in a telephone cable; an analog front end coupled with the coupling circuitry; and a controller coupled with the analog front end and configured to coordinate transmissions over the telephone line; where the controller is configured to split a Medium Access Control (MAC) cycle for the transmission into predefined slots in time for (i) downstream communication to another transceiver device coupled with the telephone line and (ii) upstream communication from the other transceiver device; and where the controller is configured to synchronize the MAC cycle with MAC cycles of additional transceiver devices coupled with the additional telephone lines in the telephone cable to align all the MAC cycles and the predefined time slots across the telephone lines.

The coupling circuitry, the analog front end, and the controller can be configured to operate in accordance with a specification designed for multi-point to multi-point communications over home electrical wiring. The specification can be a G.hn specification. The transceiver device can include a Zero Cross signal input connected to a common reference clock to synchronize all the MAC cycles and the predefined time slots across the telephone lines.

The controller can include a baseband digital signal processor programmed to use an unbalanced distribution for the predefined time slots between downstream communication and upstream communication. The baseband digital signal processor can be programmed to assign more time slots to downstream communication than upstream communication and to distribute time slots assigned to upstream communication to reduce latency. The baseband digital signal processor can be programmed to assign seven of each ten slots to downstream communication and three of each ten slots to upstream communication.

The controller can be configured to use a preamble that is different from each of other preambles used by the additional transceiver devices. The controller can be configured to select the preamble from a set of three hundred different available preambles.

According to an aspect of the described systems and techniques, a method includes selecting an orthogonal preamble from a set of available preambles for use on a telephone line that is bundled with additional telephone lines in a telephone cable; synchronizing a Medium Access Control (MAC) cycle with MAC cycles of additional transceiver devices connected respectively to the additional telephone lines bundled in the telephone cable; splitting the MAC cycle into predefined time slots aligned across communications on the additional telephone lines by the additional transceiver devices, where the predefined time slots include time slots for downstream communication and time slots for upstream communication; sending communication signals on the telephone line in the downstream time slots using the selected orthogonal preamble; and receiving communication signals on the telephone line in the upstream time slots.

The selecting can include selecting the orthogonal preamble from a set of three hundred different available preambles. The method can include using an unbalanced distribution for the predefined time slots between downstream communication and upstream communication. The can include: assigning more time slots to downstream communication than upstream communication; and distributing time slots assigned to upstream communication to reduce latency. In addition, the assigning can include assigning seven of each ten slots to downstream communication and three of each ten slots to upstream communication.

The described systems and techniques can be implemented in electronic circuitry, computer hardware, firmware, software, or in combinations of them, such as the structural means disclosed in this specification and structural equivalents thereof. This can include at least one computer-readable medium embodying a program operable to cause one or more data processing apparatus (e.g., a signal processing device including a programmable processor) to perform method operations. Thus, program implementations can be realized from a disclosed method, system, or apparatus, and apparatus implementations can be realized from a disclosed system, computer-readable medium, or method. Similarly, method implementations can be realized from a disclosed system, computer-readable medium, or apparatus, and system implementations can be realized from a disclosed method, computer-readable medium, or apparatus.

The described systems and techniques can result in a communication system for telephone line access that uses transceivers in a manner that reduces interference. For example, rather than having G.hn domains working independently of each other, G.hn domains on separate telephone lines that share a bundled telephone cable can work synchronously with each other, all transmitting or receiving at the same time. Thus, high levels of interference caused by one DM transmitting while another DM on a close line is receiving can be substantially reduced, if not eliminated, and the maximum achievable performance can be improved. Synchronizing transmission and reception across multiple lines reduces the interference caused by random relative timing of communications, thus easing the process of channel adaptation and reducing bit error rates. In addition, network setup can be made less difficult.

Interference produced in reception by near equipment that is transmitting can be avoided. This enables an increase in communication performance and stability. Accurate synchronization can allow time division into short slots, which can reduce latencies and enable the configuration of percentages for upstream and downstream directions. In addition, proper connection of each CPE to its corresponding DM (installed on the same phone pair) can be better ensured, and disturbance of service of near G.hn domains can be reduced. Isolation among different pairs can increase performance and reduce network setup. Moreover, the noted improvements can be advantageous in combination with systems and techniques used to provide FEXT stability, as described in U.S. Provisional Application Ser. No. 61/932, 599, filed Jan. 28, 2013, and also described in detail below.

Details of one or more implementations are set forth in the accompanying drawings and the description below. Other features and advantages may be apparent from the description and drawings, and from the claims.

DRAWING DESCRIPTIONS

FIGS. 1A and 1B respectively show a bundled telephone cable and a communication system that uses the bundled telephone cable.

Like reference symbols in the various drawings indicate like elements.

DETAILED DESCRIPTION

Figure 1A:
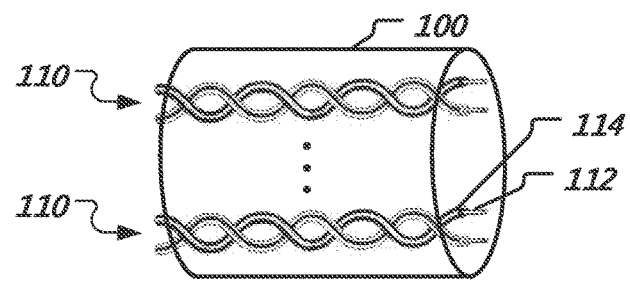

FIG. 1A shows a bundled telephone cable 100, which is a common type of telephone cable used in the existing installed infrastructure of telephone systems. The bundled telephone cable 100 includes multiple separate telephone lines 110 that are grouped together in the telephone cable 100, where the phone lines 110 go from a central location, such as a local carrier end office, to separate customer premises. Each phone line 110 can be a twisted pair of wires, or a twisted and not twisted pair of wires, with each wire having a solid copper conductor 112 and an outer insulator 114.

Bundled telephone cables 100 can include many phone lines 110, such as seventy five, one hundred, one hundred and fifty, or three hundred pairs of copper wires 110. In other cases, there are fewer pairs of wires (e.g., 10, 20, 25, etc.). Each twisted copper wire pair can be wrapped in shielding before being grouped with other wire pairs in a jacket. Nonetheless, signals on one wire pair can induce interference on another wire pair in the bundled telephone cable due to the close proximity of the wires. Such interference includes NEXT interference, where a signal being transmitted from a first end of the bundled telephone cable on one wire pair interferes with the signals being received at that same first end on another wire pair in the bundled telephone cable. Such interference also includes FEXT interference, where a signal being transmitted from a first end of the bundled telephone cable on one wire pair interferes with the signals being received at a second end of the bundled telephone cable on another wire pair in the bundled telephone cable.

Figure 1B:
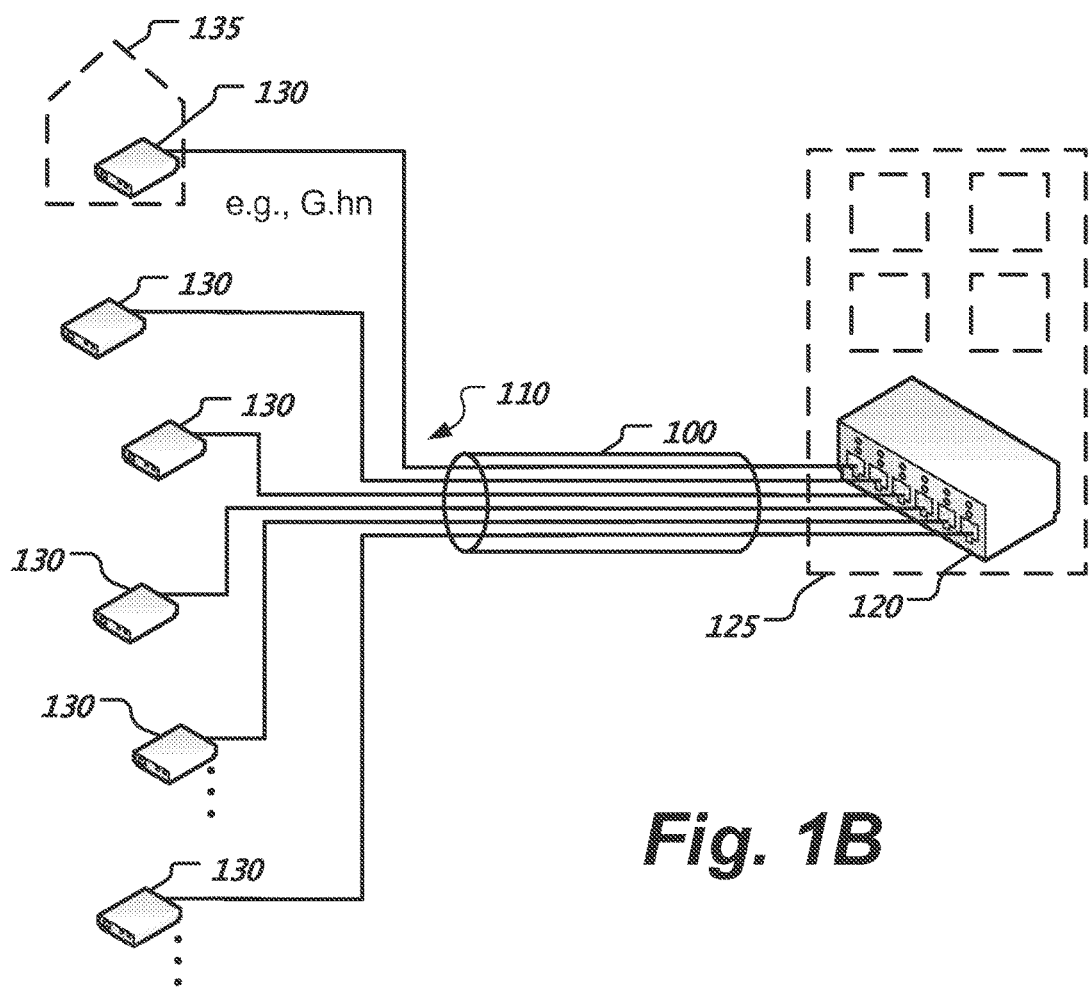

FIG. 1B shows a communication system that uses the bundled telephone cable 100 from FIG. 1A. The bundled telephone cable 100 includes multiple phone lines 110 connecting electronic equipment 120 at a first location (e.g., a central office 125 or a local carrier end office) to separate transceiver devices 130 at separate customer premises (e.g., a house 135). The electronic equipment 120 includes multiple transceiver devices, one for each of the separate transceiver devices 130 at the other end of the phone lines 110. The electronic equipment 120 can be a rack of separate devices or a single device with multiple modems. Thus, the multiple transceiver devices of equipment 120 can be separate circuit devices on a single integrated circuit (IC) chip, separate IC chips on a single circuit board, or separate electronic devices. In some implementations, the multiple transceiver devices of the electronic equipment 120 can be installed in existing DSLAM equipment used to provide DSL services. In some implementations, the multiple transceiver devices of the electronic equipment 120 can replace existing DSLAM equipment used to provide DSL services.

In some implementations, the electronic equipment 120 can combine Time Division Multiplexing (TDM) with half duplex communication such that a pair of communication devices do not transmit and receive at the same time. By transmitting from electronic equipment 120 to the separate transceiver devices 130 at the same time, and likewise receiving transmissions at the electronic equipment 120 from the separate transceiver devices 130 at the same time, NEXT interference can be avoided. This is true even while using the same frequency bands. Note that while a specific common frequency band is not critical, the frequency band used will typically be a common frequency band above the frequency band used by an analog phone service of 0-4 kHz, and also separated from this phone service frequency band by a guard band. Note that the frequency band used can come from 2 MHz to 100 MHz and can be extended to 200 MHz for short distance cables. All the phone line pairs in the same telephone cable (i.e., the potentially interfering telephone lines) should use the same frequency band using the techniques described herein to split time in downstream and upstream transmissions in a synchronized way.

In addition, each of the transceiver devices in the electronic equipment 120 and the separate transceiver devices 130 can be G.hn transceivers designed for multi-point to multi-point communications over various types of wiring, but repurposed here for single-point to single-point (or to multi-point) communications over a telephone line. For example, the transceiver devices in the electronic equipment 120 and the separate transceiver devices 130 can be transceivers that are designed to operate in accordance with a G.hn specification. Thus, a DSL-like access network can be built with G.hn domains.

Figure 2A:
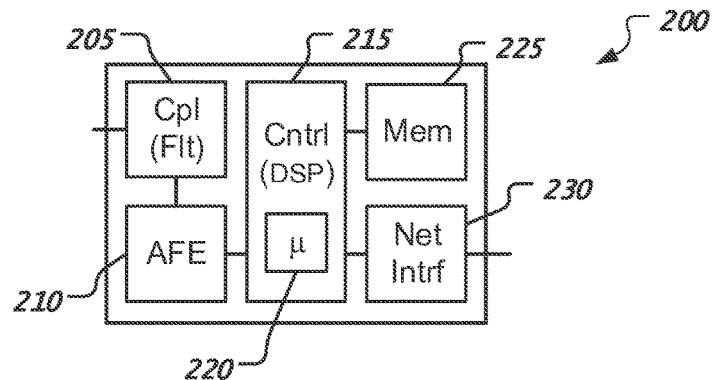
FIG. 2A shows an example of a transceiver device.

FIG. 2A shows an example of a transceiver device 200, which includes a coupling circuitry (Cpl) 205, an analog front end (AFE) 210, and a controller (Cntrl) 215. The coupling circuitry 205 can be a coupler for phone line cables and phone line signals that is impedance matched to optimize power transfer and minimize crosstalk. The coupling circuitry 205 can include filter circuitry and/or be coupled with filter circuitry, such as one or more high pass filters, and the AFE 210 can include biasing circuitry and a digital-to-analog converter (DAC) to convert the analog signals to digital signals used by the controller 215.

The controller 215 can be coupled with one or more network interface (Net Intrf) devices 230, such as a Gigabit Ethernet transceiver with multiple ports and magnetics or a wireless (e.g., WiFi) access point (AP), or connected directly to a switch or packet processing unit. In addition, the controller 215 can be a baseband Digital Signal Processor (DSP) with embedded microprocessor(s) (h) 220 and associated memory 225, which can include non-volatile memory storing instructions (e.g., firmware) that control operation of the DSP 215. In some implementations, the controller 215 can include analog-to-digital (AD) and digital-to-analog (DA) converters. The transceiver device 200 is representative of the devices on both the customer premises and the devices located at the phone company's facility, which can coordinate their activity for signal to noise ratio estimation in the telephone lines of the shared cable as described below in connection with FIGS. 4 and 5. In addition, in some implementations, these transceivers can have their communication over the telephone lines in the shared cable synchronized as described further below in connection with FIGS. 2B, 2C, and 3.

Figure 2B:
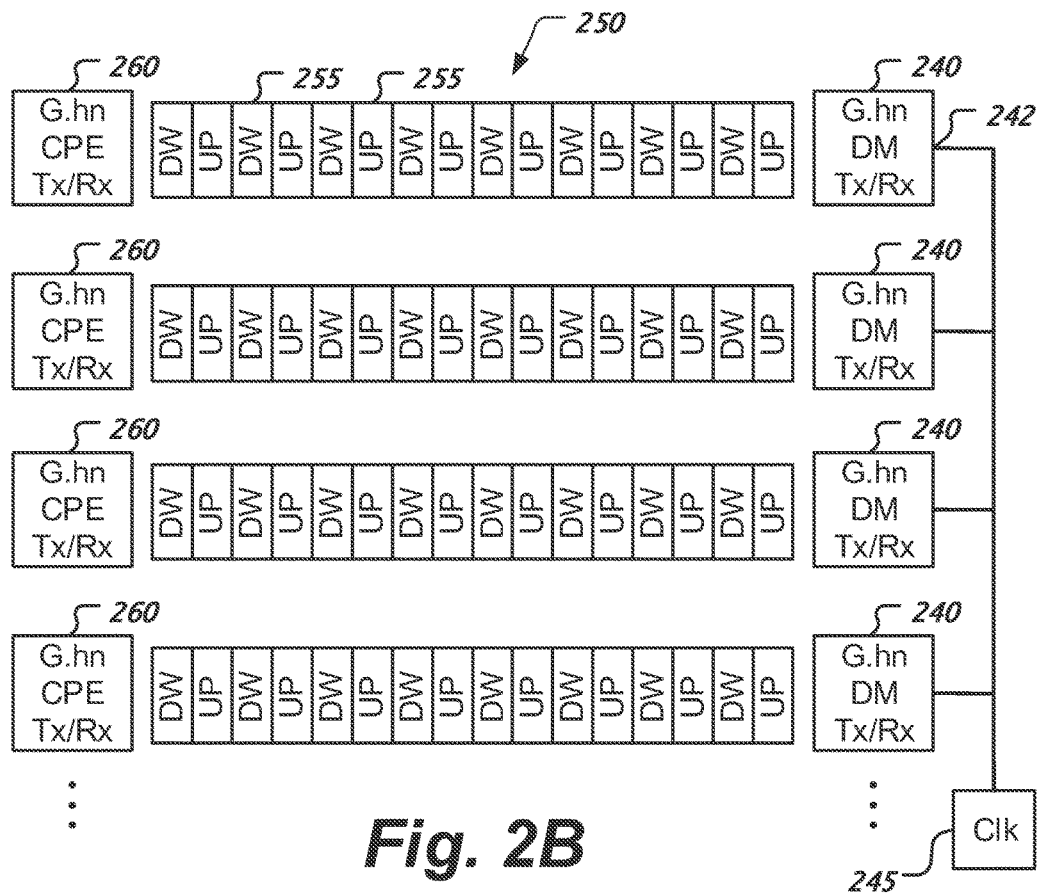
FIG. 2B shows an example of a communication system with transceiver devices synchronized for communication on separate wires that share a common cable.

FIG. 2B shows an example of transceiver devices 240 synchronized for communication on separate wires that share a common cable, such as a bundled telephone cable (not shown). In this example, each transceiver device 240 operates as both a transmitter (Tx) and a receiver (Rx), and each transceiver device 240 is a G.hn device that operates as a Domain Master (DM), which coordinates transmissions over its respective domain (e.g, the telephone line connecting the transceiver device 240 to its corresponding G.hn CPE transceiver (Tx/Rx) 260). The DMs have their respective Medium Access Control (MAC) cycles synchronized with each other, and each DM splits its MAC cycle 250 into predefined time slots 255 for downstream communication (DW) from the DMs to the CPEs and upstream communication (UP) from the CPEs to the DMs.

As shown in FIG. 2B, synchronizing the DMs causes their MAC cycles 250 to be aligned for all communications across the telephone lines. In some implementations, the synchronization can be readily done using existing hardware. An external MAC synchronization signal (e.g., a Zero Crossing signal) input 242 for each transceiver device 240 (e.g., a zero cross detector input to an IC chip) can be connected to a common reference clock (Clk) 245 to synchronize the transceiver devices 240. This circuit is used in G.hn to synchronize all nodes in a G.hn domain with a common pattern and is used here to synchronize all domains in one or more DSLAMs. Thus, the same clock signal (e.g., a 50 Hz or 60 Hz clock signal) can be connected to the signal input 242 of all DMs of the potentially interfering G.hn networks to accomplish accurate time synchronization. So rather than use an AC line of a power line communication (PLC) system to synchronize a MAC cycle, an external source is used to synchronize multiple MAC cycles for transceivers connected to different wire pairs. Using the same clock can avoid potential issues produced by clock deviations. The reference clock frequency is flexible, and a clock frequency of 25 Hz or 50 Hz can be used to minimize potential customization needed in a G.hn system. Note that this reference clock can be shared among all DSLAMs transmitting in the same telephone cable and suffering from NEXT, and so the system is readily scalable. In some implementations, the synchronization signal may be derived from network packets based on IEEE (Institute of Electrical and Electronics Engineers) 1588 Precision Time Protocol (PTP).

Thus, a DSL-like access network can be built with G.hn domains. One domain with a pair of G.hn devices 240, 260 can be provided per line, with each domain for the respective telephone lines having a different domain identifier. Each DM 240 can be placed at a DSLAM at the telephone company's facility, and each respective CPE 260 can be placed at the separate customer premises. Note that in some implementations, more than one CPE 260 can be attached to the same phone line at a customer site.

By synchronizing in time all the DMs of the G.hn domains that could interfere (e.g., those present in the same DSLAM or injecting signal in a same multi pair telephone cable) and splitting the MAC cycle in prefixed slots for Downstream (DW) and Upstream (UP), the synchronous characteristic of the G.hn MAC can be leveraged to avoid NEXT interference. The MAC can assign the time slots according to this rule, so each DM 240 can transmit only in DW slots, and each CPE 260 can transmit only in UP slots. Thus, the transmission scheme is fixed and synchronized in all G.hn domains so all downstream traffic (DM to CPE) occurs simultaneously, and likewise upstream (CPE to DM), preventing NEXT interference.

The clock reference defines the G.hn MAC cycle, and the MAC cycle is divided into short time slots (e.g., sixteen time slots of 0.875 ms each for a MAC cycle of 14 ms) with each time slot being assigned to a fixed transmission direction. This division allows the balancing in Downstream and Upstream, but the same distribution must be configured in all DM having NEXT interference with each other. In the example shown in FIG. 2B, the DW and UP time slots are evenly distributed in the synchronized MAC cycles (50% in Up and 50% in Down). Thus, the predefined time slots 255 alternate between DW and UP slots for the entire length of the MAC cycle, which is sixteen slots in this example.

Figure 2C:
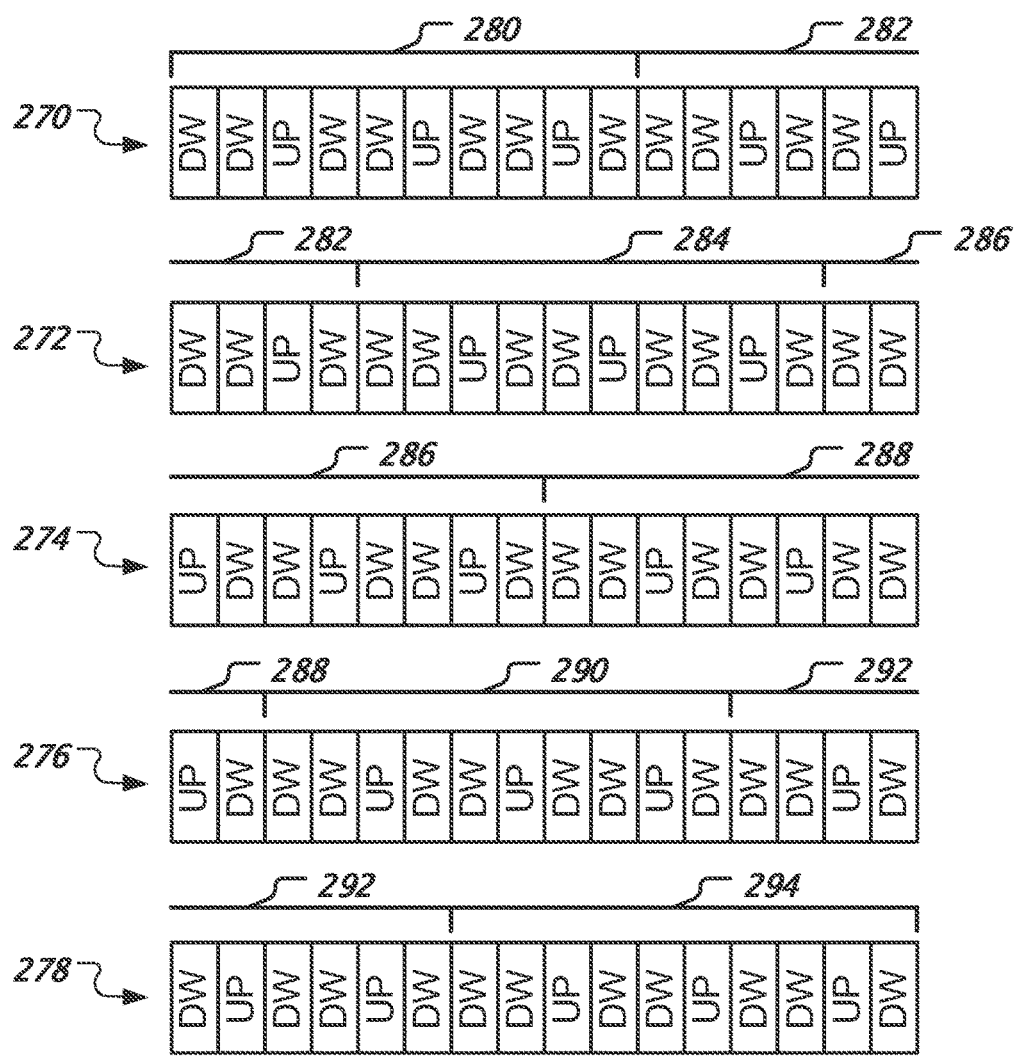
FIG. 2C shows an example of an unbalanced distribution between downstream communication and upstream communication for predefined time slots in the communication system of FIG. 2B.

However, in other embodiments, the predefined time slots have an unbalanced distribution between downstream communication and upstream communication. FIG. 2C shows an example of an unbalanced distribution between downstream communication and upstream communication for predefined time slots in the communication system of FIG. 2B. In the example shown, the unbalanced distribution favors downstream communication (70% Down and 30% Up) since downloading at CPE sites will typically be more common than uploading. The disfavored time slots (UP in this example) can be distributed in a manner that reduces latency that might otherwise occur. The selection of the split between Down and Up is flexible (e.g., from 50/50 to 80/20) and can be defined and fixed prior to installation, which simplifies the system. In some cases though, a dynamic and flexible distribution of Down/Up slots is possible using an external entity to inform in a synchronized way to all different domains of the type (Down/Up) of each time slot.

Various approaches to distributing the disfavored time slots can be used. In the example shown, each MAC cycle includes sixteen time slots, and seven of each ten time slots are assigned for downstream (DW) communication, while three of each ten time slots are assigned for upstream (UP) communication, and the three UP time slots are distributed to reduce latency. Thus, each set of ten time slots 280, 282, 284, 286, 288, 290, 292, 294 is divided into the following DW/UP pattern: DW, DW, UP, DW, DW, UP, DW, DW, UP, DW. Eighty is the first integer that is evenly divisible by both ten and sixteen, so the ten time slots 280, 282, 284, 286, 288, 290, 292, 294 are distributed among five (eighty/sixteen) MAC cycles 270, 272, 274, 276, 278, as shown in FIG. 2C (note that the separate sections in FIG. 2C is showing a common scheduling that rolls over and not different scheduling for different telephone lines in the same bundle). Other distributions are also possible. For example, a time slot pattern (such as DW, DW, UP) can be repeated across MAC cycles for a number of MAC cycles needed to form a larger repeating pattern (e.g., sixteen repetitions of the DW, DW, UP pattern across three MAC cycles of sixteen slots each).

While synchronizing the MAC cycles and aligning DW and UP time slots across multiple transceivers addresses NEXT interference, FEXT interference can still be an issue. For example, in a G.hn implementation, a receiver on one twisted wire pair could synchronize with a transmitter on another twisted wire pair, thus reducing efficiency of the system. To address this issue, different orthogonal preambles can be used in each transceiver controller (e.g., G.hn DM) to transform interfering signals into noise for other lines (e.g., the other G.hn domains). The orthogonal preambles can be similar to those defined in traditional G.hn, but more and different preambles than the standard preambles specified for a home wiring phone line profile are provided, as described herein.

Table 1 below shows three hundred different seeds used to generate the pseudo-random sequences of the preambles for a phone profile in accordance with the systems and techniques described herein. The seeds are shown in hexadecimal format and have been designed to provide good insulation between the different preambles generated; note that not all preambles have the same characteristics. Moreover, the provision of three hundred different preambles can facilitate the use of equipment with bundled telephone cables with different numbers of twisted wire pairs, as enough preambles will be available regardless of whether the bundled telephone cable has ten, twenty, twenty five, fifty, seventy five, one hundred, one hundred and fifty, or three hundred wire pairs.

TABLE 1

Seeds for Orthogonal Preambles for Telephone Profile

| | | | | | | | | | |
|---|---|---|---|---|---|---|---|---|---|
| 0x024E | 0x1C1D | 0x1358 | 0x0583 | 0x15BC | 0x0042 | 0x01F0 | 0x0BB9 | 0x1D50 | 0x1AB3 |
| 0x17A9 | 0x1ADE | 0x12D7 | 0x08E9 | 0x0D3A | 0x0432 | 0x07A4 | 0x1CA3 | 0x1D26 | 0x1C70 |
| 0x0F53 | 0x1B5B | 0x1016 | 0x054A | 0x0B06 | 0x0340 | 0x041D | 0x13F8 | 0x121A | 0x0686 |
| 0x10F3 | 0x05B3 | 0x02DE | 0x0397 | 0x11D2 | 0x1992 | 0x0AE0 | 0x0021 | 0x1B4E | 0x16B8 |
| 0x1545 | 0x084F | 0x0B14 | 0x016F | 0x0A95 | 0x0819 | 0x1491 | 0x0219 | 0x03E1 | 0x01D0 |
| 0x01E6 | 0x0029 | 0x1437 | 0x058A | 0x072F | 0x1EA3 | 0x185D | 0x11A0 | 0x0F48 | 0x1E55 |
| 0x0A8A | 0x0637 | 0x0AF6 | 0x0A1B | 0x03F9 | 0x0EA5 | 0x0BF0 | 0x1CC9 | 0x083B | 0x0294 |
| 0x098E | 0x121E | 0x15CF | 0x157B | 0x1C49 | 0x1FC4 | 0x08A7 | 0x0BB6 | 0x15C0 | 0x155A |
| 0x06B2 | 0x1EFB | 0x1E04 | 0x1AE7 | 0x1F75 | 0x1A86 | 0x1671 | 0x1033 | 0x0923 | 0x07A0 |
| 0x17C9 | 0x102F | 0x0CDF | 0x0F02 | 0x1EC4 | 0x0AA1 | 0x1E92 | 0x1D46 | 0x10BA | 0x1867 |
| 0x00A7 | 0x154F | 0x14AF | 0x066F | 0x1428 | 0x19D9 | 0x1E24 | 0x1D4B | 0x17E0 | 0x18BB |
| 0x131C | 0x14C7 | 0x1530 | 0x0A57 | 0x0553 | 0x0D3B | 0x0FBA | 0x1F88 | 0x114E | 0x0B47 |
| 0x0D64 | 0x0CDE | 0x1B55 | 0x0A98 | 0x0596 | 0x01D5 | 0x0F62 | 0x150D | 0x0CE2 | 0x0297 |
| 0x0F93 | 0x0880 | 0x085F | 0x0DAA | 0x00BB | 0x191B | 0x1A14 | 0x1542 | 0x1D24 | 0x1E10 |
| 0x014F | 0x09AC | 0x0592 | 0x042F | 0x135D | 0x1DCA | 0x02A9 | 0x13B3 | 0x176C | 0x0EDA |
| 0x14FC | 0x096B | 0x1B2A | 0x12C9 | 0x0A5D | 0x0C62 | 0x12CB | 0x1A76 | 0x0D18 | 0x04B4 |
| 0x044C | 0x0D6F | 0x1E42 | 0x1D95 | 0x1539 | 0x09E7 | 0x105D | 0x03AB | 0x1A0C | 0x0E9D |
| 0x0B96 | 0x0DAD | 0x07E8 | 0x01FC | 0x1E4C | 0x12BE | 0x19AE | 0x1236 | 0x0D9F | 0x0576 |
| 0x040D | 0x02D9 | 0x1503 | 0x1C85 | 0x19A7 | 0x161B | 0x052E | 0x1B94 | 0x097D | 0x1120 |
| 0x0119 | 0x0427 | 0x0F10 | 0x0FD0 | 0x1B4B | 0x06DC | 0x1A9C | 0x18C4 | 0x0C80 | 0x1B29 |
| 0x037E | 0x1014 | 0x038A | 0x0A06 | 0x186E | 0x0E36 | 0x0F26 | 0x13CE | 0x03FA | 0x080A |
| 0x0074 | 0x131B | 0x0A34 | 0x1E20 | 0x1522 | 0x10E5 | 0x0CD3 | 0x057C | 0x1C26 | 0x196C |
| 0x1A7E | 0x180B | 0x1878 | 0x0715 | 0x1CE2 | 0x0389 | 0x0DA5 | 0x0C36 | 0x0DE6 | 0x0541 |
| 0x0226 | 0x043D | 0x1170 | 0x1469 | 0x1EB0 | 0x1955 | 0x0C37 | 0x0DB8 | 0x1CB4 | 0x15DF |
| 0x1E0E | 0x1DF6 | 0x03E4 | 0x10F0 | 0x1547 | 0x1C12 | 0x0A91 | 0x1C6C | 0x0F2C | 0x195D |
| 0x172C | 0x005F | 0x1251 | 0x02E1 | 0x083C | 0x17BA | 0x0E71 | 0x01CA | 0x14BC | 0x172B |
| 0x081B | 0x0A9E | 0x0253 | 0x07C9 | 0x001C | 0x1EA8 | 0x0F58 | 0x0713 | 0x1FAE | 0x055E |
| 0x0232 | 0x098F | 0x0F66 | 0x04A3 | 0x1772 | 0x1E93 | 0x1AA3 | 0x12AA | 0x1971 | 0x1FDA |
| 0x06FC | 0x19BD | 0x0ADE | 0x04A6 | 0x1946 | 0x190D | 0x141E | 0x1825 | 0x02C8 | 0x0755 |
| 0x00E8 | 0x1100 | 0x069D | 0x1ECC | 0x07F0 | 0x1DA7 | 0x000E | 0x0F75 | 0x0584 | 0x03A7 |

Figure 3:
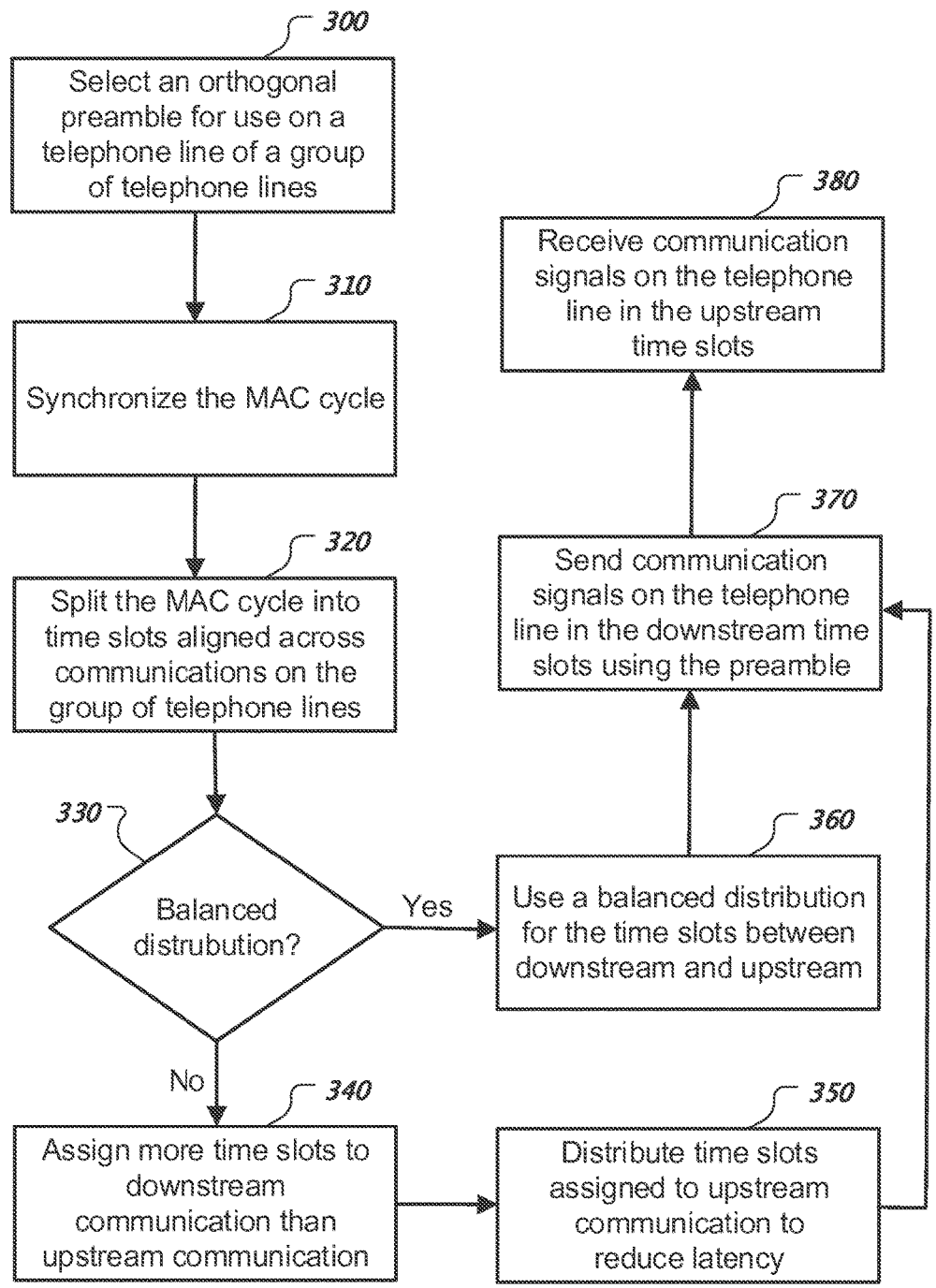
FIG. 3 shows an example of a process for communicating on a phone line of a bundled telephone cable having multiple phone lines.

FIG. 3 shows an example of a process for communicating on a phone line of a bundled telephone cable having multiple phone lines. At 300, an orthogonal preamble is selected from a set of available preambles for use on a telephone line that is grouped with additional telephone lines in a bundled telephone cable. In some implementations, three hundred different preambles can be made available. Moreover, the selection can be based on line number. For example, there can be a fixed relationship between a line's ordinal number in the bundled telephone cable the preamble selected for the line. This can simplify device installation.

At 310, the MAC cycle is synchronized with MAC cycles of additional transceiver devices connected respectively to the additional telephone lines grouped in the bundled telephone cable. For example, each of the MAC cycles can be synchronized to a common clock reference signal provided on a signal input (e.g., a Zero Crossing signal input) in G.hn implementations. At 320, the MAC cycle is split into predefined time slots aligned across communications on the additional telephone lines by the additional transceiver devices. The predefined time slots include time slots for downstream communication and time slots for upstream communication and can be short relative to the MAC cycle (e.g., the MAC cycle can be divided into sixteen slots).

At 330, a determination can be made regarding whether to have a balanced distribution of downstream and upstream slots, or an unbalanced distribution. For example, at the time of installation (or upon a reset operation) an input can be provided that indicates the type of slot distribution to use, and this input can be processed to determine the type of distribution to effect. If a balanced distribution is to be used, this is done so at 360. If an unbalanced distribution is to be used, this can be a predefined unbalanced distribution, or a process can be employed to define the unbalanced distribution based on various factors, including potentially user input.

At 340, more time slots can be assigned to downstream communication than upstream communication. In some implementations, the reverse can be done, but in typical implementations there will be more downstream communications than upstream communications. For example, the assigning can involve assigning seven of each ten slots to downstream communication and three of each ten slots to upstream communication. Other ratios are also possible. In addition, at 350, the time slots assigned to upstream communication (or downstream in the case that downstream communication is given fewer slots) can be distributed to reduce latency. This can involve distributing the slots across multiple MAC cycles, such as described above.

At 370, communication signals are sent on the telephone line in the downstream time slots using the selected orthogonal preamble. Note that the preamble is the first signal sent on the line and can be used to synchronize the transmitter with the receiver. At 380, communication signals are received on the telephone line in the upstream time slots. As will be appreciated, the sending and receiving are an ongoing process, even though shown in the figure as sequential operations.

Furthermore, before full speed communication of data signals can commence on a telephone line, an estimation of signal to noise ratio (SNR) on that telephone line is typically needed. Although NEXT (Near End Crosstalk) can be reduced by synchronizing the upstream and downstream transmissions, and FEXT (Far End Crosstalk) can also be at least partially addressed using orthogonal preambles, as described above, there can still be an issue related to FEXT, producing a variable SNR depending on whether there are concurrent transmissions in the adjacent lines.

This instability in the SNR can produce a problem in the receivers when doing channel adaptation, which determines the number of bits per sub-carrier to use or bit allocation table (BAT). The root cause of the problem is that the amount of interfering signal may be different when measuring the channel SNR and deriving the BAT than when using that estimated BAT during data transmission. If the SNR during data transmissions is lower than the SNR during BAT estimation, the BLER (block error rate) may be too high.

Figure 4:
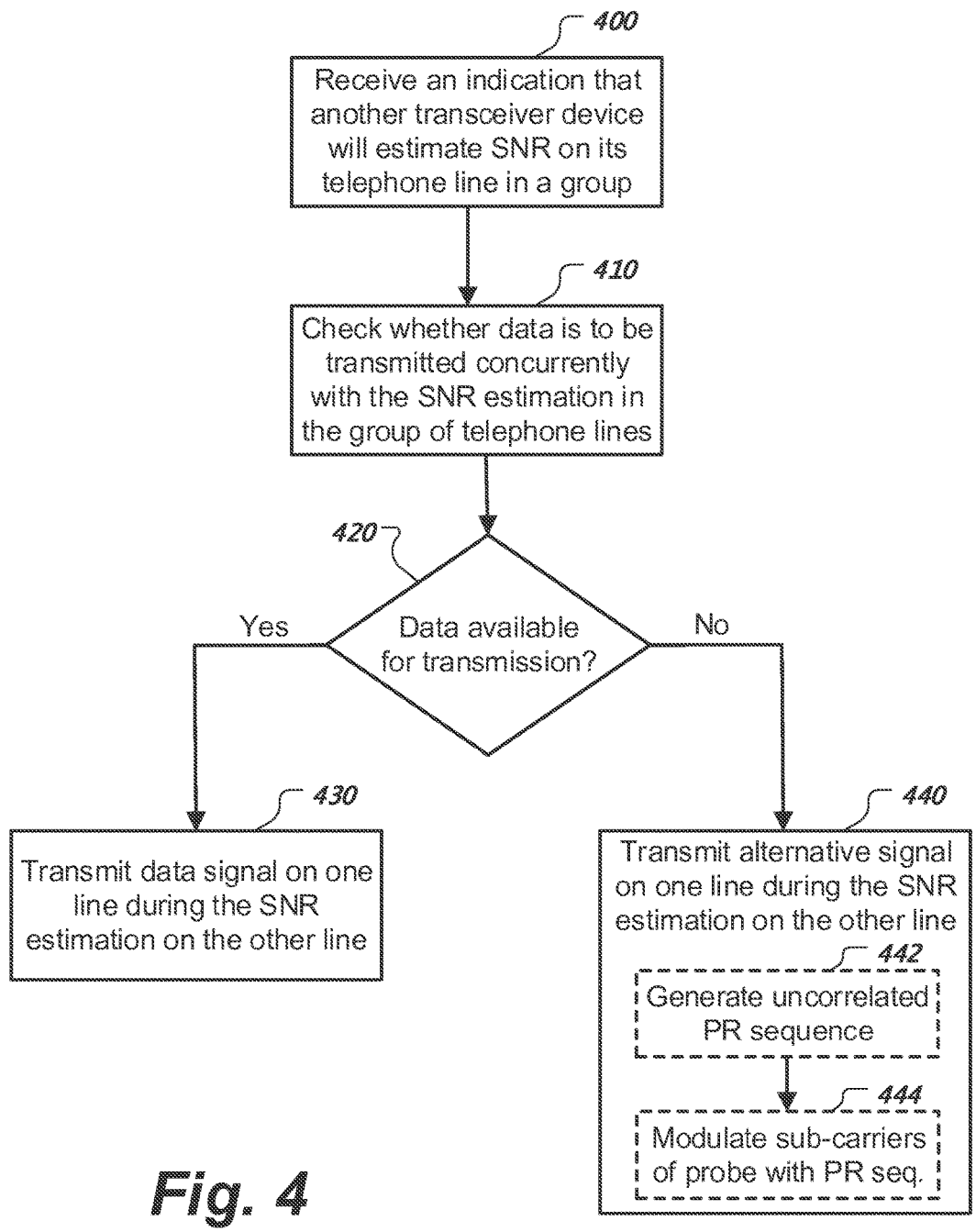
FIG. 4 shows an example of a process for increasing stability of signal to noise ratio estimation on a phone line of a bundled telephone cable having multiple phone lines.

FIG. 4 shows an example of a process for increasing stability of SNR estimation on a phone line of a bundled telephone cable having multiple phone lines. At 400, an indication is received at a first transceiver device coupled with a first telephone line. The indication identifies that a second transceiver device coupled with a second telephone line is to estimate SNR on the second telephone line, where the second telephone line is separate from but grouped with the first telephone line with respect to possible FEXT.

SNR estimation can be done at start up and periodically or by means of a trigger (change in BLER, for instance). A DSLAM can have a Central Processing Unit (CPU) for managing the equipment. This CPU has a management interface with all the DMs. If a DM needs to estimate SNR (or its attached CPE), the DM can use the management interface with that CPU to signal this, and the CPU can broadcast the request to the rest of DMs using the management interface. This interface can be implemented by a protocol over an Ethernet link. In addition, the MAC cycle synchronization allows having a common time base to signal when the SNR estimation period starts and ends.

At 410, a check is made in response to the indication as to whether data is to be transmitted by the first transceiver device on the first telephone line during the SNR estimation by the second transceiver device on the second telephone line. Data packets are stored in queues waiting for the time slot in the MAC to be able to be transmitted. Therefore, if the slot arrives and the queue is empty, there is not data to transmit. Queues can be monitored before each transmission opportunity. In a time slot, several transmissions, called frames, can be sent. Those transmissions are separated by a small idle time called IFG (interframe gap). In the case where there is only data for only a part of the SNR estimation time, the rest of the time is completed by transmitting PROBE frames (SNR estimation frames loaded with data from the LFSR or PR sequence). Thus, data frames can be followed by PROBE frames during that SNR estimation time. Note that the IFG idle time is not affecting the SNR estimation because the IFG idle time is very short in duration.

If data is available for transmission at 420, then a data signal is transmitted at 430 on the first telephone line during the SNR estimation by the second transceiver device on the second telephone line. On the other hand, if data is not available for transmission at 420, then an alternative signal is transmitted at 440 on the first telephone line during the SNR estimation by the second transceiver device on the second telephone line. It should be noted that this runs counter to the traditional G.hn specification, in which a node remains silent when the node does not have data to transmit. In addition, although the exemplary process described in connection with FIG. 4 involves a signaling protocol that forces transmission of the alternate signal only when another transceiver device is going to estimate the SNR, in some implementations the forced transmission of an alternate signal can occur whenever the transceiver device has no data to transmit. In contrast, the signaling protocol described in connection with FIG. 4 allows the nodes to remain muted if there is no data to send once the channel has been estimated, as the worst case had been measured, thus saving power.

Various options are available for transmission of the alternative signal at 440. In some implementations, transmitting the alternative signal involves generating an uncorrelated pseudo-random (PR) sequence, at 442, and modulating sub-carriers of the transmission (e.g., the payload of a probe frame) with the generated PR sequence at 444. The PR sequence (and thus the transmission) can be made uncorrelated with other PR sequences (and thus other transmissions) on the other telephone lines in a telephone cable by using different pseudo-random function generators or by using different initial seeds to the same pseudo-random function generator. In some implementations, the same pseudo-random function generator can be used in all transceiver devices coupled with telephone lines in a group, and the initial seed can be different for each pair of transceiver devices (DM and one or more CPEs) coupled to the same telephone line, or each transceiver device can have its own, unique initial seed. Such seeds can be chosen so as to generate uncorrelated PR sequences with the peak to average ratio (PAR) of the generated Orthogonal Frequency Division Multiplexing (OFDM) symbols being below a threshold to avoid clippings. In some implementations, the seeds of Table 1 above can be used. The DM can be assigned a seed value, and the DM can communicate that seed value to its CPEs.

Figure 5:
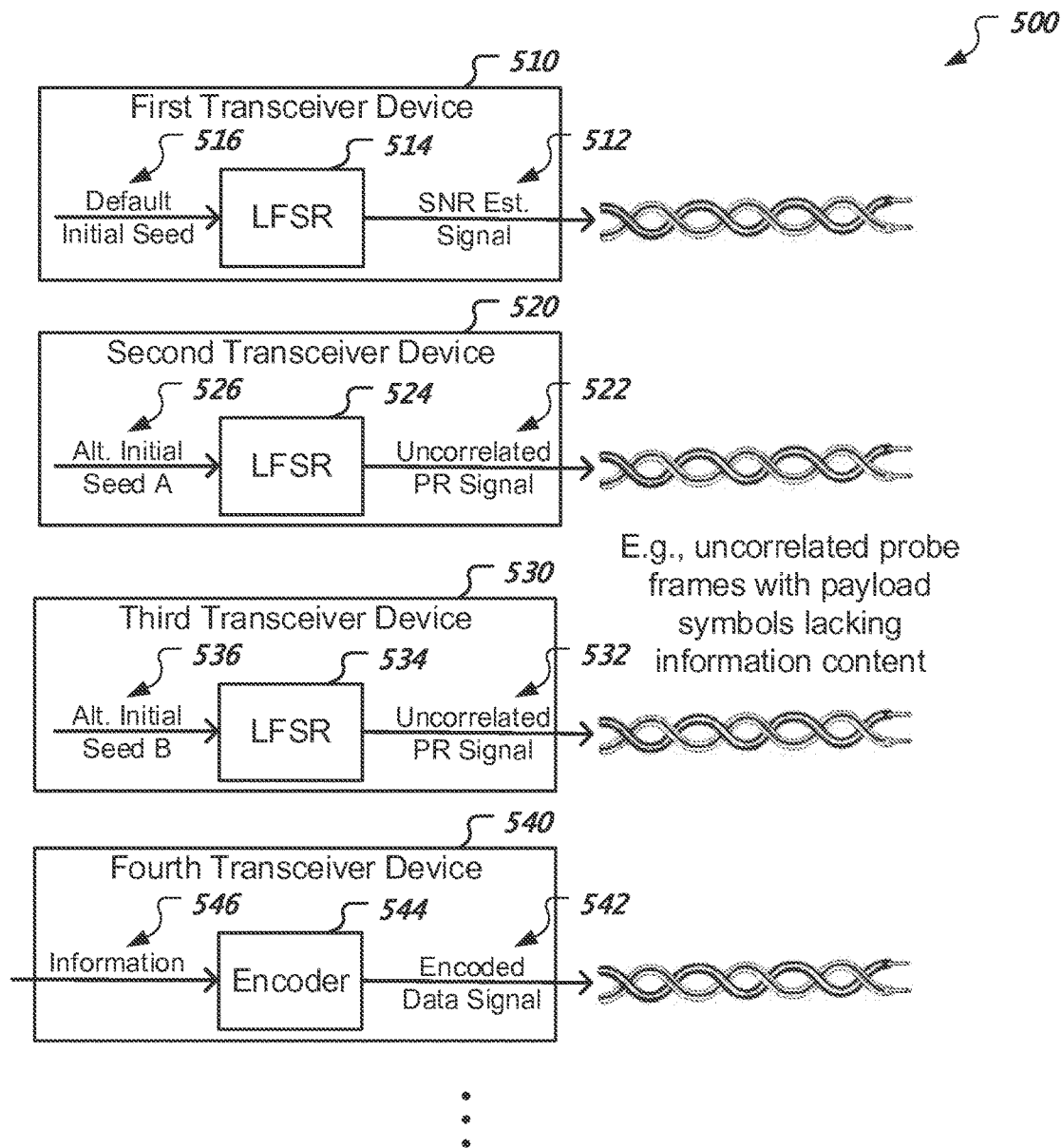
FIG. 5 shows an example of a communication system with different concurrent operations of transceiver devices coupled with separate wires that share a common cable.

FIG. 5 shows an example of a communication system 500 with different concurrent operations of transceiver devices coupled with separate wires that share a common cable. Each of the wires in the figure is shown as being a twisted copper pair, but other types of telephone lines, as well as other wire configurations (e.g. a power line or coax cable) are also possible. The system 500 shows only the transceiver devices on one side of the telephone lines, but the description below applies equally to both sides, so the side shown can be either the DM side or the CPE side. In addition, even though significant portions of this description are made with reference to the G.hn specification, other implementations are possible, as will be appreciated.

The system 500 shows four transceiver devices, but fewer or more transceiver devices are also possible. Some implementations will include seventy five, one hundred, one hundred and fifty, or three hundred transceiver devices on each side of the telephone lines, and potentially more on the CPE side since each customer location can have more than one transceiver device coupled with the same telephone line. In addition, FIG. 5 shows a particular point in time when one of the transceiver devices is estimating SNR, two of the transceiver devices are transmitting an uncorrelated PR signal, and one of the transceiver devices is transmitting an encoded data signal, but it will be appreciated that each of the transceiver devices can take on each of these different operations at different times. The key point is that a given transceiver device (or node in the system 500) is forced to transmit (always or selectively) even when that transceiver device has no data to transmit, in order to avoid instability in SNR estimation.

A first transceiver device 510 generates and transmits an SNR estimation signal 512. This can involve channel estimation and adaptation. In some implementations, the number of bits per sub-carrier to use is determined, and a bit allocation table (BAT) is constructed. In some implementations, this is done in accordance with the G.hn specification. In some implementations, a channel estimation probe frame is transmitted where the probe symbols composing the payload are all channel estimation probe symbols. These channel estimation probe symbols can be generated by a linear feedback shift register (LFSR) 514 whose initial seed 516 for the first sub-carrier of the first symbol of the payload is a default value (which can be fixed in accordance with a G.hn specification) that is known at the receiving side. Thus, the known sequence can be used at the receiving side to estimate the signal to noise ratio on the channel.

Concurrent with the transmission of the SNR estimation signal 512, a second transceiver device 520 and a third transceiver device 530, which are both connected with separate telephone lines that are grouped with the first telephone line for the first transceiver device 510, transmit respective uncorrelated PR signals 522 and 532. These signals 522 and 532 are forced transmissions that would normally not occur because the transceiver devices 520 and 530 have no data to transmit at that time. But by forcing transmission on these other telephone lines concurrent with the SNR estimation by the first transceiver device 510, the receiver(s) on the other side of the telephone line from the transceiver device 510 can get a more accurate assessment of the SNR likely to be seen during normal operation.

Note that a fourth transceiver device 540, which is also designed to provide forced transmissions, does not have a forced transmission at the same time since the fourth transceiver device 540 has an encoded data signal 542 to send on its telephone line. Further, as noted above, the forced transmissions can be done whenever there is no data to send (i.e., always do forced transmissions) or whenever there is both no data to send and one or more other transceiver devices are estimating SNR. In either case, providing a system in which such forced transmissions are made allows the receivers in the system to estimate a more stable SNR as the interference is stable, thus potentially diminishing errors, latency and jitter. In a sense, the system can be viewed as working in a more stable "worst case" scenario.

In some implementations, the forced transmissions 522 and 532 can be probe frames, such as those used in G.hn for channel estimation. Thus, when a device has a time slot assigned for transmission and the device has no data to transmit, the device can program a probe frame transmission so that the adjacent links suffer a stable interference. In the probe frames from respective devices 520 and 530, sub-carriers can be loaded with bits coming from respective LFSRs 524 and 534. But it may not be desirable to have different nodes generate probe frames with the same bit sequence modulated in the sub-carriers of the same payload symbols, which can have a negative side effect in a DSL-like phone access application because several nodes might be transmitting synchronized probe frames with the same contents. In this case, the interference coming from other lines (domains) might add-up coherently producing a higher (or lower if the interference is destructive) level of interference compared with the case of uncorrelated transmissions (normal case when transmitting data when signals add-up non-coherently) preventing a good accurate SNR estimation.

To address this issue, the respective LFSRs 524 and 534 can use different initial seed values for their pseudo-random sequence generation: alternative initial seed A 526 and alternative initial seed B 536. Note that although device 540 is shown in FIG. 5 as having an encoder 544 generating the encoded data signal 542 from input information 546, the device 540 also has an LFSR and its own different seed value for use when the device 540 does not have data to send while another device is doing SNR estimation. Likewise, the device 510 has its own different seed value for use when the device 510 does not have data to send while another device is doing SNR estimation, and each of devices 510, 520 and 530 have encoders for data transmission for use when the devices 510, 520 and 530 have information to send on their respective telephone lines.

In some implementations, a different initial seed can be provided per domain (pair of nodes in one line). Each respective LFSR can generate a given fixed pseudo-random sequence where the initial seed determines the offset in that sequence to make the bits required to modulate the first sub-carrier of the first payload symbol. In some implementations, the specific offset into the sequence is not important, provided the offsets used by different transceivers on the different telephone lines are different, since the generated symbols are intended to be simply random and therefor lack information content. By choosing different initial offsets into the generated sequence (different initial seeds) per domain, the probe frames generated by other domains will be different. This prevents probe frames from different domains from adding up coherently.

A few embodiments have been described in detail above, and various modifications are possible. The disclosed subject matter, including the functional operations described in this specification, can be implemented in electronic circuitry, computer hardware, firmware, software, or in combinations of them, such as the structural means disclosed in this specification and structural equivalents thereof, including potentially a program operable to cause one or more data processing apparatus to perform the operations described (such as a program encoded in a computer-readable medium, which can be a memory device, a storage device, a machine-readable storage substrate, or other physical, machine-readable medium, or a combination of one or more of them).

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

While this disclosure contains many specifics, these should not be construed as limitations on the scope of what may be claimed, but rather as descriptions of features that may be specific to particular embodiments. For example, details are provided with regard to G.hn implementations. However, the systems and techniques described herein can also be employed in systems using Time Division Multiple Access (TDMA), like the IEEE (Institute of Electrical and Electronics Engineers) Standard 1901 or ITU G.Fast.

Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments.

Other embodiments fall within the scope of the following claims.

What is claimed:

1. A system comprising:
electronic equipment located at a first location, the electronic equipment comprising a plurality of first transceiver devices, wherein:
each first transceiver device is configured for coupling to a respective one of a plurality of telephone lines bundled together in a same telephone cable, to connect to a respective one of a plurality of second transceiver devices at a second location;
each first transceiver device controls communication over the respective telephone line, the controlling comprises:
assigning separate time slots for uplink communication from first transceiver device to the second transceiver device and downline communication from the second transceiver device to the first transceiver device; and
coordinating communication with other ones of the plurality of first transceiver devices, wherein the coordinating comprises aligning use of the time slots; and
based on said aligning, each first transceiver device assigns the time slots based on an unbalanced distribution between the downstream communication and the upstream communication, wherein the unbalanced distribution comprises more time slots assigned to downstream communication than to upstream communication.

2. The system of claim 1, wherein each of the plurality of first transceiver devices is configured to operate in accordance with a specification designed for multi-point to multi-point communications over home electrical wiring.

3. The system of claim 2, wherein the specification is a G.hn specification.

4. The system of claim 1, wherein more than one second transceiver device share the upstream communication slots on the single telephone line.

5. The system of claim 1, wherein the plurality of first transceiver devices are synchronized to coordinate communications with the plurality of second transceiver devices.

6. The system of claim 5, wherein the plurality of first transceiver devices is synchronized based on a common reference clock.

7. The system of claim 1, wherein each first transceiver device assigns the time slots to meet a particular performance criterion.

8. The system of claim 1, wherein each one of the plurality of first transceiver devices is configured to use a preamble that is different from each other preamble used by remaining ones of the plurality of first transceiver devices.

9. A transceiver device comprising:
coupling circuitry that connects the transceiver device with a telephone line that is bundled with additional telephone lines in a telephone cable;
an analog front end coupled with the coupling circuitry; and
a controller that controls communications over the telephone line, via the analog front end and the coupling circuitry, wherein the controlling comprises:
assigning separate time slots for uplink communication from the transceiver device to a corresponding remote transceiver device on the other side of the telephone line, and downline communication from the remote transceiver device to the transceiver device; and
coordinating transmissions over the telephone line with one or more other transceiver devices, wherein each of the of the one or more other transceiver devices is coupled to one of the additional telephone lines in the telephone cable, wherein the coordinating comprises aligning time slots across the telephone lines; and
wherein the controller synchronizes the transceiver device with the one or more other transceiver devices connected to a common reference clock to synchronize all the MAC cycles and the time slots across the telephone lines.

10. The transceiver device of claim 9, wherein the coupling circuitry, the analog front end, and the controller are configured to operate in accordance with a specification designed for multi-point to multi-point communications over home electrical wiring.

11. The transceiver device of claim 10, wherein the specification is a G.hn specification.

12. The transceiver device of claim 9, wherein the controller comprises a baseband digital signal processor.

13. The transceiver device of claim 9, wherein the controller synchronizes the transceiver device with the one or more other connected based on a common reference clock.

14. The transceiver device of claim 9, wherein the controller assigns the time slots based on an unbalanced distribution between the downstream communication and the upstream communication.

15. The transceiver device of claim 14, wherein the unbalanced distribution comprises more time slots assigned to downstream communication than to upstream communication.

16. The transceiver device of claim 9, wherein the controller assigns the time slots to meet a particular performance criterion.

17. The transceiver device of claim 9, wherein the controller uses a preamble that is different from each of other preambles used by the additional transceiver devices.

18. A transceiver device comprising:
coupling circuitry that connects the transceiver device with a telephone line that is bundled with additional telephone lines in a telephone cable;
an analog front end coupled with the coupling circuitry; and a controller that controls communications over the telephone line, via the analog front end and the coupling circuitry, wherein the controlling comprises:
assigning separate time slots for uplink communication from the transceiver device to a corresponding remote transceiver device on the other side of the telephone line, and downline communication from the remote transceiver device to the transceiver device; and
coordinating transmissions over the telephone line with one or more other transceiver devices, wherein each of the of the one or more other transceiver devices is coupled to one of the additional telephone lines in the telephone cable, wherein the coordinating comprises aligning time slots across the telephone lines; and
based on said aligning, wherein the controller assigns the time slots based on an unbalanced distribution between the downstream communication and the upstream communication, the unbalanced distribution comprising more time slots assigned to downstream communication than to upstream communication.

19. The transceiver device of claim 18, wherein the coupling circuitry, the analog front end, and the controller are configured to operate in accordance with a specification designed for multi-point to multi-point communications over home electrical wiring.

20. The transceiver device of claim 19, wherein the specification is a G.hn specification.

21. The transceiver device of claim 18, wherein the controller comprises a baseband digital signal processor.

22. The transceiver device of claim 18, wherein the controller synchronizes the transceiver device with the one or more other connected based on a common reference clock.

23. The transceiver device of claim 18, wherein the controller assigns the time slots to meet a particular performance criterion.

24. The transceiver device of claim 18, wherein the controller uses a preamble that is different from each of other preambles used by the additional transceiver devices.

* * * * *